United States Patent [19]
Thielen et al.

[11] Patent Number: 5,809,854
[45] Date of Patent: Sep. 22, 1998

[54] BORING BAR DEVICE AND METHOD OF ASSEMBLY

[75] Inventors: Robert C. Thielen, Anoka; Craig A. Hiatt, Isanti, both of Minn.

[73] Assignee: National Tooling & Machining, Inc., Minneapolis, Minn.

[21] Appl. No.: 672,083

[22] Filed: Jun. 27, 1996

[51] Int. Cl.$^6$ .................................................. B23B 29/02
[52] U.S. Cl. ........................... 82/153; 407/101; 407/118; 408/144; 82/160
[58] Field of Search ...................... 407/118, 119, 407/101, 30, 32, 33, 34, 40, 46, 47, 51, 53, 66, 102; 408/144, 145, 199, 226, 227, 239 R, 231, 239 A; 82/153, 160

[56] References Cited

U.S. PATENT DOCUMENTS

| | | | |
|---|---|---|---|
| 1,887,372 | 11/1932 | Emmons | 408/144 |
| 3,254,392 | 6/1966 | Novkov | 407/118 X |
| 3,768,342 | 10/1973 | Kroder | 76/101 |
| 4,008,976 | 2/1977 | Holzl | 408/144 |
| 4,258,807 | 3/1981 | Fischer et al. | 175/375 |
| 4,277,106 | 7/1981 | Sahley | 407/118 X |
| 4,668,118 | 5/1987 | Bucher et al. | 403/272 |
| 4,688,652 | 8/1987 | Crist | 175/410 |
| 4,817,742 | 4/1989 | Whysong | 76/108.2 |
| 4,976,418 | 12/1990 | Harville | 269/43 |
| 5,098,233 | 3/1992 | Patterson et al. | 407/101 |

FOREIGN PATENT DOCUMENTS

| | | | |
|---|---|---|---|
| 3314349 | 10/1984 | Germany | 408/144 |

*Primary Examiner*—A. L. Pitts
*Assistant Examiner*—Henry W. H. Tsai
*Attorney, Agent, or Firm*—Anthony G. Eggink

[57] ABSTRACT

A boring bar device comprising an elongated shank and a chisel head. The shank and chisel head are connected by a mating V-shaped cross-sectional joint wherein a solder shim of a predetermined composition is utilized in conjunction with a brazing process to connect the chisel head to the elongated shank to provide the boring bar device of the invention.

17 Claims, 2 Drawing Sheets

BORING BAR DEVICE AND METHOD OF ASSEMBLY

BACKGROUND OF THE INVENTION

This invention relates generally to boring bar devices, and particularly, to boring bar structures comprised of a shank structure having a chisel point attached thereto. The invention relates to the structure of the boring bars, as well as the method used to attach the chisel point to the shank of the boring bar.

In the past various boring bar structures have been proposed and utilized. Generally, such structures have included the use of a stepped shank to chisel point joining wherein mating stepped configurations were utilized between the boring bar shank and the chisel point. Alternatively, mating conical configurations have been utilized to join the boring bar shank and the chisel point.

These prior art structures, however, have resulted in difficulties to achieve proper alignment between the boring bar shank and the chisel point. Further, the configuration of such prior art joining has been found to place undue stresses on the bonding between the boring bar shank and the chisel point.

The boring bar structures and processes of the present invention overcome the difficulties and shortcomings of the prior art. The boring bar structures of this invention provide for the precise alignment of the chisel point to the boring bar shank. Further, the invention utilizes a brazing process to secure the chisel point to the boring bar shank and which in conjunction with the joining configuration of this invention provides for a strong and accurately aligned boring bar structure for cutting purposes.

The object of the present invention is to provide a boring bar device which is constructed of parts that are accurately aligned and strongly joined in a manner to withstand the forces exerted on the boring bar structure during use. It is a further object of the invention to provide a method of assembly which permits the quick and accurate alignment and joining of a chisel point to a shank structure by utilizing a brazing process.

SUMMARY OF THE INVENTION

A boring bar device comprising an elongated shank and having a V-shaped cross-sectional configuration at one end. A chisel head is provided having a V-shaped cross-sectional end for matingly connecting to the elongated shank. The shank and chisel head are connected by a brazing process which includes the use of a predetermined solder shim material.

The solder shim material preferably comprises a layered silver/copper/silver material wherein the outside silver layers comprise a silver alloy of approximately 45% silver. The layered shim material further has a thickness of approximately 0.015 inches wherein the outside silver layers have a thickness of approximately 0.002 inches and the inside copper layer has a thickness of approximately 0.010 inches.

The assembly method for the boring bar device of the present invention includes providing an alignment fixture having a base, a front portion and a holding member with an alignment bore. The front portion has a tip aperture which is aligned with the alignment aperture of the holding member. A chisel head is provided having a tip portion at one end and a V-shaped cross-sectional second end. An elongated shank having a V-shaped cross-sectional end is provided for mating connection to the second end of the chisel head. A solder shim of a predetermined material is placed between the V-shaped cross-sectional ends of the elongated shank and the chisel head and mounted in the alignment fixture with the tip portion of the chisel head placed within the tip aperture of the front portion. The chisel head/shim/shank combination is secured in the holding member of the alignment fixture.

A brazing process generating a temperature of approximately 1400° F. is utilized to melt the solder shim material and to, thereby, fix the chisel head to the elongated shank. The tip portion is removed or cut from the chisel head to provide a completed boring bar device.

These and other benefits of this invention will become clear from the following description by reference to the drawings.

DESCRIPTION OF THE PREFERRED EMBODIMENT

Figure 1:
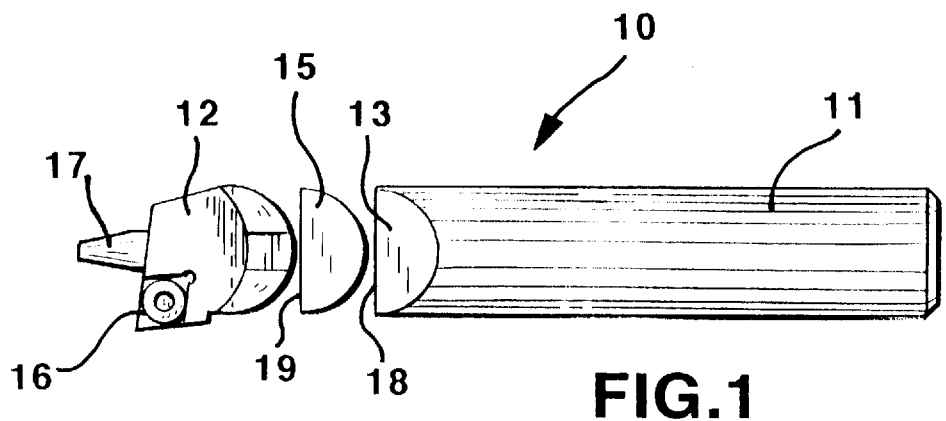
FIG. 1 is a top plan view showing the chisel point and shank of the boring bar device of the present invention before assembly.
Figure 2:
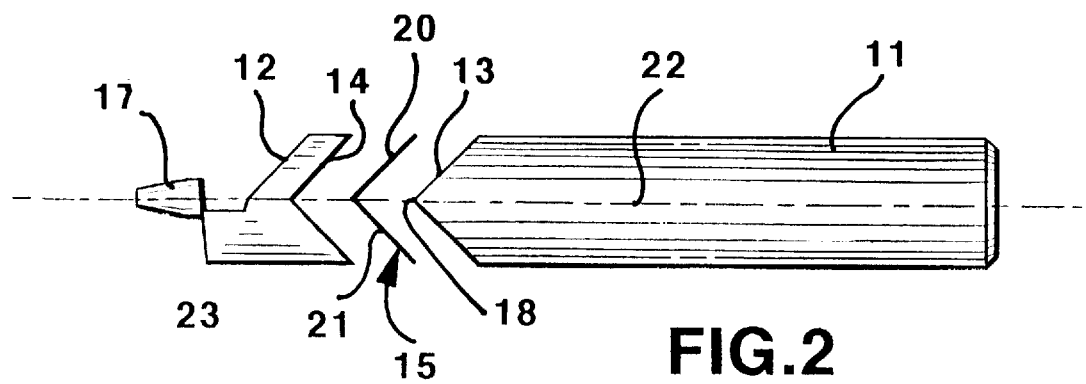
FIG. 2 is a side plan view of the boring bar device of FIG. 1.
Figure 3:
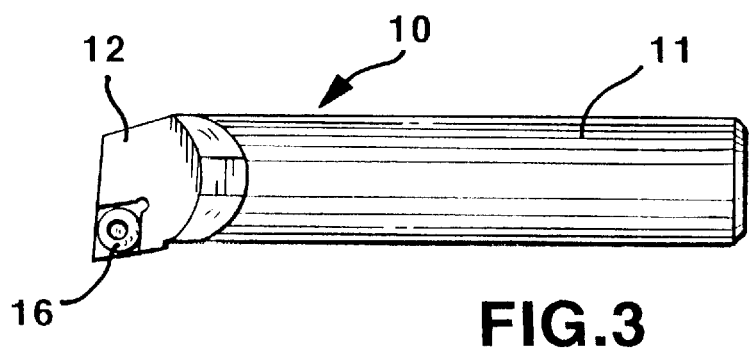
FIG. 3 is a top plan view of an assembled boring bar device.
Figure 4:
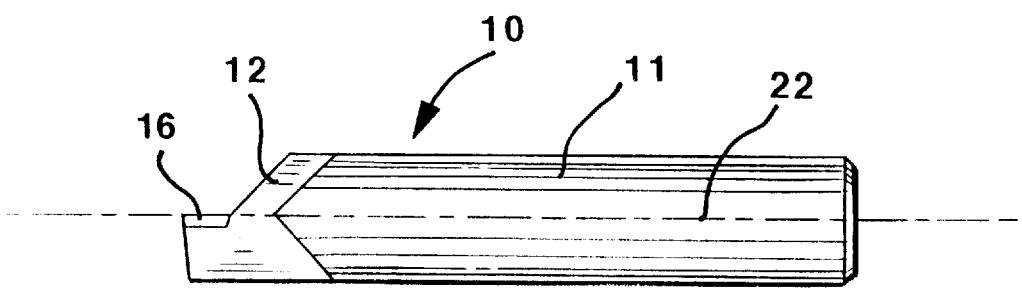
FIG. 4 is a slide plan view of the assembled boring bar device of FIG. 3.
Figure 5:
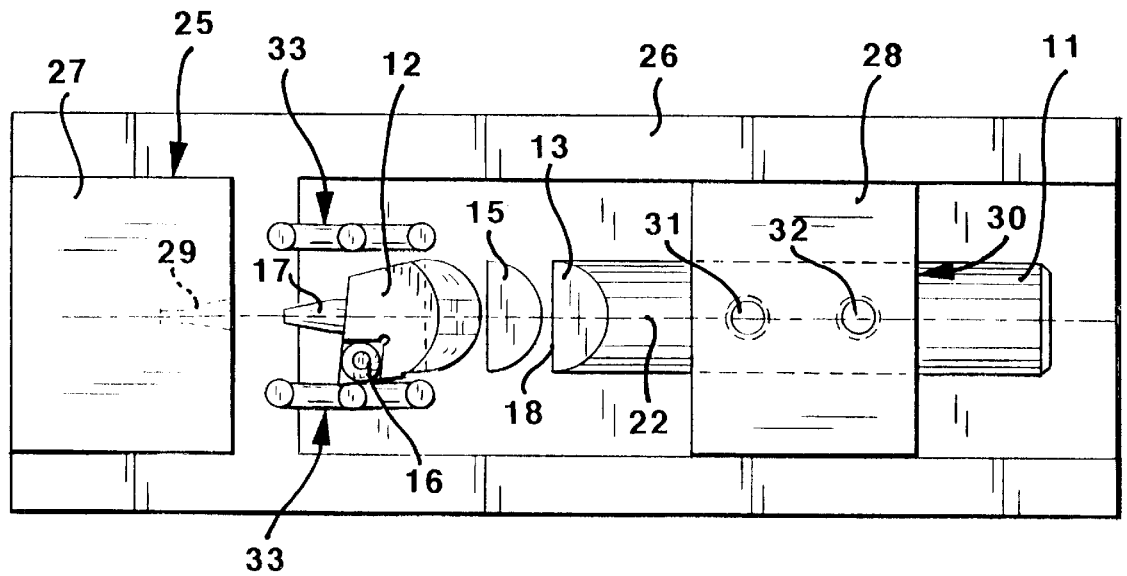
FIG. 5 is a top plan view showing the alignment fixture utilized in the assembly process to connect the chisel head to the shank of the boring bar device.
Figure 6:
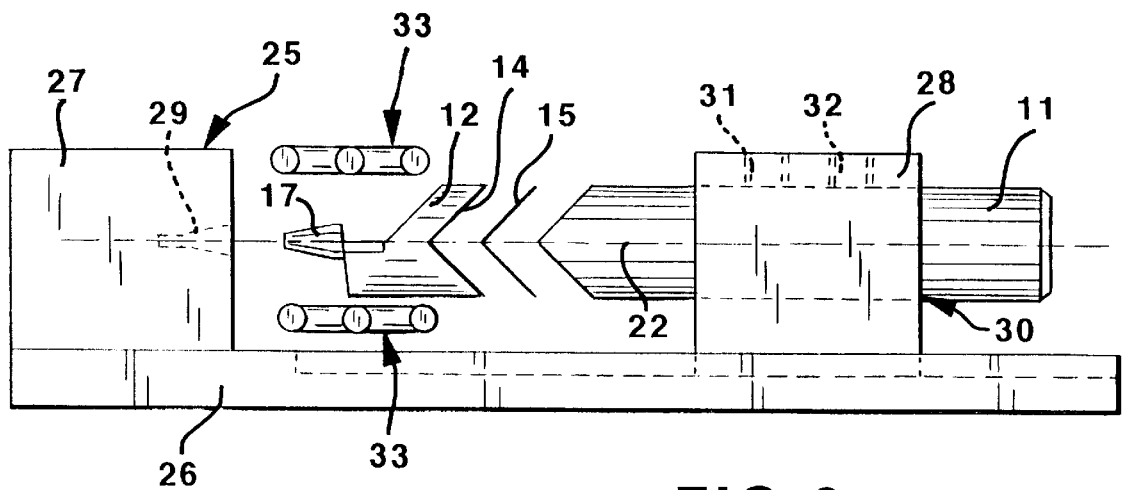
FIG. 6 is a side plan view of the alignment fixture of FIG. 5.

The boring bar device and method of assembly of the present invention are shown in the drawings wherein FIGS. 1 and 2 are top and side views, respectively, of the elements used to construct the boring bar device. FIGS. 3 and 4 show top and side views, respectively, of the assembled boring bar device and FIGS. 5 and 6 show top and side views, respectively, of the alignment fixture used in the method of assembly of the boring bar devices.

FIGS. 1 and 2 show the boring bar 10 having a carbide shank 11 and a chisel point member 12. The cutting element 16 used in the boring process is attached to the chisel point member 12. The carbide shank 11 has a V-shaped end 13 and the chisel point member 12 has a matching V-shaped cutout 14. The V-shaped end 13 and the V-shaped cutout 14 have matching angles of approximately 90° and they are attached to or bonded together at this intersection. The matching angles, however, may range from 80°–100°. The V-shaped cutout 14 of the chisel point 12 is shown to have an apex 23 and the V-shaped end 13 of shank 11 is shown to have an apex 18. The apex 18 and apex 23 are further shown aligned along central axis 22.

A shim member 15 is shown placed between the carbide shank 11 and the chisel point 12. The shim material 15 is used in a brazing process to join the chisel point 12 to the carbide shank 11. As shown, the shim material 15 has portions 20 and 21 which are placed, respectively, on the opposing joining faces 13 and 14. Prior to the brazing process to join the chisel point 12 to the carbide shank 1 a flux material is preferably utilized to clean the shim material 15 and the surfaces to be joined. As is known, the acidic nature of the flux materials cleans the metallic surfaces to promote uniform flow during the welding or brazing.

An alignment tip 17 is shown attached to chisel point 12. The alignment tip 17 is utilized in the assembly process of the boring bar device 10 and is subsequently removed as will be further discussed below. As shown particualarly in FIGS. 2, 5 and 6, the alignment tip 17 is positioned along central axis 22.

Important to this invention is the V-shaped joint between the shank 11 and chisel point 12 of the boring bar, as well as the method of fastening the chisel point member 12 to the carbide shank11. The silver/copper/silver solder shim 15 is utilized in the brazing process. The silver/copper/silver shim 15 has a thickness of approximately 0.015 inches and is brazed or welded (i.e., induction welding) at approximately 1400° F. to join the chisel point to the shank. Although an induction welding process is preferred, an oxyacetylene welding process may be used. This brazing process has been found to yield an extremely strong bond between the chisel point 12 and carbide shank 11.

As shown in FIGS. 5 and 6, an alignment fixture 25 is provided to align the elongated shank 11 and the chisel head 12. The alignment fixture 25 has a base 26, a front member 27 and a holding member 28. An alignment bore 30 is provided through holding member 28 to receive the shank 11 and apertures 31 and 32 extending through the top of the holding member 28 are provided to receive screws to secure the boring bar elements within the alignment fixture 25 for the brazing process. The chisel head 12 is shown to have a protrusion 17 which is inserted into a centrally disposed tip aperture 29 of the alignment fixture 25. The protrusion 17 is subsequently removed or cut from the chisel head 12 subsequent the brazing process to provide the boring bar device 10 as shown in FIGS. 4 and 5.

An induction coil 33 is shown positioned within the confines of the alignment structure 25. The induction coil 33 is constructed and arranged whereby the V-shaped joint between the chisel head 12 and the elongated shank 11 having the shim material 15 therebetween is positioned with the confines of the induction coil 33 when the protrusion 17 is placed within the tip alignment aperture 29 and the shank 11 is secured in the alignment bore 30 of holding member 28. The induction coil 33 causes the temperature of the shim material 15 to be brought up to the proper brazing temperature of approximately 1400° F. to cause the shim material to melt and flow within the confines of the V-shaped joint between the chisel head 12 and shank 11. However, other melting methods may be utilized within the purview of this invention to cause the shim material 15 to be melted.

The method for assembling the boring bar structure 10 comprises the following process steps: first an elongated shank 11 is provided having a central axis 22 and having an end 13 which has a generally V-shaped cross-section. The angle of end 13 may range between 80° and 100° and is preferably 90°. Next, a chisel head 12 is provided having a V-shaped cross-sectional end which matches the angle of the end 13 of the shank 11. Although the matching and mating ends of the shank 11 and chisel head 12 are shown to be disposed in a convex and concave-like manner, respectively, this mating configuration may be reversed whereby the V-shaped cutout is disposed in the shank 11.

A solder material in shim form and comprised of a predetermined composition is placed between the mating faces of the shank 11 and chisel head 12. The solder shim material is preferably comprised of a layered silver/copper/silver material having a thickness of approximately 0.015 inches and wherein the outside silver layers have thicknesses of approximately 0.002inches. Further, each silver layer is preferably comprised of a silver alloy wherein the silver content is approximately 45%.

Next, the shank 11, solder shim 15 and chisel head 12 arrangement is aligned along axis 22 and held in an aligned manner. Preferably, the chisel head 12 is provided with an alignment tip 17 and an alignment fixture 25 is provided and utilized as shown in FIGS. 5 and 6. Finally, the solder shim material is brought to a brazing temperature of approximately 1400° F. and subsequentially cooled. The boring bar device 10 is thereby provided as shown in FIGS. 3 and 4 subsequent the removal of the alignment tip 17 from the chisel head 12.

In summary, the combination of the matching V-shaped joints between the chisel point and the elongated shank and the silver/copper/silver shim used to braze the chisel point and shank are important to this invention. The silver/copper/silver brazing process provides a strong bond while the V-shaped joint provides a physical joining arrangement whereby the forces exerted on the chisel point when the boring bar is utilized minimizes the resultant forces on the weld or bond between the two joined structures.

As many changes are possible to the embodiments of this invention utilizing the teachings thereof, the descriptions above, and the accompanying drawings should be interpreted in the illustrative and not the limited sense.

That which is claimed:

1. A boring bar structure, comprising:
    a) an elongated shank having a generally central axis, a first end and a second end, said first end having a V-shaped cross-sectional configuration with an apex intersecting said central axis;
    b) a chisel head having a first end with means to receive a cutting member and a second end having a predetermined V-shaped cut out to matingly receive said V-shaped cross-sectional first end of said elongated shank; and
    c) a bonding layer to secure said chisel head to said elongated shank, said bonding layer formed by brazing a solder shim material comprising a layered silver/copper/silver composition wherein said outside layers are comprised of a silver alloy comprising approximately 45% silver.

2. In combination, a boring bar structure and an alignment fixture, comprising:
    a) an elongated shank having a generally central axis, a first end and a second end, said first end having a V-shaped cross-sectional configuration with an apex intersecting said central axis;
    b) a chisel head having a first end with means to receive a cutting member and a second end having a predetermined V-shaped cut out to matingly receive said V-shaped cross-sectional first end of said elongated shank, said chisel head having a removable protrusion extending from said first end;
    c) a bonding layer to secure said first end of said chisel head to said second end of said elongated shank; and
    d) said alignment fixture having a central alignment aperture for receiving said removable protrusion of said chisel head and being constructed and arranged to align said elongated shank and said chisel head for bonding said shank and chisel head.

3. A boring bar structure, comprising:
    a) an elongated shank having a generally central axis, a first end and a second end, said first end having a convex V-shaped cross-sectional configuration terminating at a linear apex, an alignment plane intersecting said linear apex and extending along said central axis;

b) a chisel head having a first end with means to receive a cutting member, which is generally aligned with said alignment plane and a second end having a predetermined concave V-shaped cut out to matingly receive said convex V-shaped cross-sectional first end of said elongated shank; and c) a bonding layer to secure said chisel head to said elongated shank.

4. The boring bar structure of claim 3 wherein said cutting member includes a cutting tip and wherein said cutting member is generally aligned along said alignment plane.

5. The boring bar structure of claim 3, wherein said mating V-shaped cross-sectional configuration has a predetermined angle and wherein said predetermined angle ranges between 60° and 120°.

6. The boring bar structure of claim 5, wherein said predetermined angle is approximately 90°.

7. The boring bar structure of claim 3, wherein said bonding layer is provided by means of a brazing process using a solder shim material.

8. The boring bar structure of claim 7, wherein said solder shim material comprises a layered silver/copper/silver shim material.

9. The boring bar structure of claim 8, wherein said solder shim comprises a top layer of silver material, a center layer of copper material, and a bottom layer of silver material and further wherein said outside silver layers comprise a silver alloy comprised of approximately 45% silver.

10. The boring bar structure of claim 8, wherein said layered shim material has a thickness of approximately 0.015 inches.

11. The boring bar structure of claim 10, wherein said outside silver layers each have, a thickness of approximately 0.002 inches and wherein said inside copper layer has a thickness of approximately 0.010 inches.

12. The boring bar structure of claim 7, wherein said brazing process comprises the use of an induction coil constructed and arranged to provide a current generating a temperature of approximately 1400° F.

13. The boring bar structure of claim 7, wherein pressure is exerted along said central axis between said elongated shank and said chisel head during said brazing process.

14. The boring bar structure of claim 7, wherein a flux is provided prior to initiating said brazing process.

15. The boring bar structure of claim 3, in combination with an external alignment fixture and wherein said alignment fixture is provided to align said elongated shank and said chisel head prior to the formation of the bonding layer.

16. The boring bar structure of claim 15, wherein said alignment fixture includes a central alignment aperture and wherein said chisel head includes a removable protrusion for insertion into said central alignment aperture of said alignment fixture.

17. The boring bar structure of claim 3, wherein said elongated shank is constructed of a carbide composition.

* * * * *